Patented June 13, 1944

2,350,984

UNITED STATES PATENT OFFICE 2,350,984

SELECTIVE CHLORINATION OF PROPYLENE IN THE PRESENCE OF ACETYLENES

Edgar C. Britton and Myron E. Huscher, Midland, Mich., assignors to The Dow Chemical Company, Midland, Mich., a corporation of Michigan No Drawing. Application August 30, 1941, Serial No. 409,121

4 Claims. (Cl. 260—660)

This invention relates to the selective chlorination of propylene in mixtures of the same with lower acetylenes.

In the manufacture of unsaturated hydrocarbons by the pyrolysis of petroleum oils, or fractions thereof, complex hydrocarbon mixtures are usually obtained. The separation of these mixtures into their components is in many instances difficult. Thus, in the preparation of ethylene by cracking processes, there is usually obtained along with the ethylene large quantities of propylene and appreciable quantities of butylene, isobutylene, acetylene, methyl acetylene, ethyl acetylene, lower saturated hydrocarbons, and the like. The major portion of the ethylene may be separated from such mixtures in any of a number of known ways, e. g. by compressing and cooling the gaseous mixture to liquefy butane, the butylenes and higher hydrocarbons and scrubbing the remaining gases with an oil to dissolve propylene, acetylene, methyl acetylene and propane and leave the ethylene as an easily separable mixture with methane, ethane, and hydrogen. By distilling the oil solution of gases from the scrubbing operation, the propylene, acetylene, and methyl acetylene together, usually, with minor amounts of propane and possibly some ethane, may be segregated into a single low boiling fraction, but further fractional distillation to separate these compounds from one another is difficult, uneconomical and hazardous due to the explosive properties of acetylene when in high concentration and under pressure. This same fraction is encountered in the working up of products from other cracking processes and, since propylene may serve as the starting material in the production of a number of commercially valuable compounds, its isolation from the above mixture either in the pure state or as a valuable derivative is of considerable importance.

We have found that a mixture comprising propylene and a lower acetylenic hydrocarbon may be selectively chlorinated to convert the propylene into propylene chloride and leave the acetylenic hydrocarbon substantially unchanged. The propylene chloride may then be separated readily from the acetylenic hydrocarbon.

The reaction between the chlorine and the propylene is usually carried out by dissolving the mixture containing propylene and the lower acetylene, e. g. acetylene and/or methyl acetylene, in an organic solvent less reactive than the propylene with the chlorine. Among others, chlorinated solvents such as carbon tetrachloride, ethylene chloride, propylene chloride, trichloropropane, acetylene tetrachloride, and saturated aliphatic hydrocarbons may be used. Propylene chloride may be used advantageously since the step of separating the solvent and the principal product is thereby eliminated. The reaction is conveniently carried out continuously by introducing the chlorine and the mixture of propylene and lower acetylene through separate inlets into the bottom of a reaction tower filled with propylene chloride. In this manner the propylene and chlorine reactants are largely dissolved before coming into contact with each other, and the possibility of an explosive gas mixture, i. e. of the hydrocarbons and chlorine, being formed is reduced. Unreacted gases, e. g. the acetylenes and any propane introduced together with the propylene and any air which may be introduced with the chlorine, escape from the top of the tower after the liquid has become saturated therewith. They may be washed with water to remove traces of hydrochloric acid, which may be formed as a by-product during the reaction and then be further purified or utilized as desired. The liquid overflow from the column may, if desired, be washed with water or steam distilled to remove traces of acids or catalysts and then be fractionally distilled to purify the propylene chloride. In case a solvent other than propylene chloride is used, it may be returned continuously to the tower from the distillation apparatus. Minor amounts of trichloropropanes are usually formed during the reaction and small amounts of monochloropropane may also be formed, either by the chlorination of propane, if present, or by reaction between hydrochloric acid and propylene. These by-products may be separated from the propylene chloride during the fractional distillation. If desired, the reaction may be carried out batchwise by chlorinating a solution of the propylene-containing hydrocarbon mixture in the desired solvent.

The reaction is carried out in liquid phase preferably at room temperature or slightly above, e. g. at temperatures up to 90° C. However, it may be carried out at any temperature between the boiling point of the liquid mixture of solvent and propylene chloride and the freezing or congealing temperature of the reaction mixture. The formation of trichloropropanes is increased somewhat as the temperature is raised above room temperature. At temperatures considerably lower than room temperature small amounts of unchlorinated propylene may be evolved from the reaction mixture along with the acetylenes.

Approximately one mol of chlorine is used for each mol of propylene in the hydrocarbon mixture. A slight excess of chlorine, e. g. up to 1.1 molecular equivalent, may be used if desired, to allow for the formation of small amounts of monochloropropane and trichloropropane and still have sufficient chlorine available to combine with substantially all of the propylene while leaving the acetylenic hydrocarbon substantially unchanged. The use of larger proportions of chlorine may result in the production of larger amounts of trichloropropane and of halogen derivatives from the acetylenes, e. g. tetrachlorethane and tetrachloropropane.

The course of the reaction is influenced somewhat by certain catalytic substances which may be present, although the use of such substances is by no means essential. Iron surfaces increase the formation of trichloropropanes and hydrogen chloride, but lead and glass surfaces do not. Ferric chloride and antimony trichloride, on the other hand, catalyze the formation of propylene chloride. As little as 0.01 per cent of these latter substances based on the weight of the propylene reacted have been found to be effective. The reaction proceeds smoothly and rapidly, only a few seconds contact between the dissolved propylene and chlorine being needed to effect substantially complete reaction. The reaction is conveniently carried out at atmospheric pressure, but higher or lower pressures may be used.

The chlorine used should preferably be substantially free of moisture in order to reduce corrosion in the equipment and to prevent reaction of water with the catalyst, if used. It is not essential that the chlorine be free of air, although this is desirable in order to prevent dilution of the vented gases with air and the consequent possibility of explosive mixtures being formed.

The following example will serve to illustrate the principle of the invention, but is not to be construed as limiting its scope.

*Example*

372 grams of propylene chloride and 1.5 grams of anhydrous ferric chloride were placed in a glass tower filled with glass beads. A gaseous mixture of 69.4 grams of acetylene and 192 grams of propylene was introduced through an inlet tube into the bottom of the tower over a period of 2.75 hours. Dry chlorine containing a minor proportion of air was simultaneously introduced into the tower through a second inlet tube a few inches above the inlet tube for the hydrocarbon mixture. The unreacted hydrocarbons and the air introduced with the chlorine were vented from the top of the tower and were collected. The issuing gases were analyzed from time to time, and the flow of gases to the reaction vessel adjusted so that the vented gases contained a minimum of unreacted propylene. The temperature of the liquid in the reaction vessel was maintained throughout the reaction period at 50° C. At the end of the reaction period the liquid in the tower, which was found to contain 5.13 grams of hydrochloric acid, was steam distilled to remove it from the ferric chloride catalyst and hydrochloric acid and then fractionally distilled. There were thus obtained 4.8 grams of propylene, 12.4 grams of monochloropropane, 780 grams of propylene chloride and 33.1 grams of trichloropropane. No acetylene tetrachloride was detected. The yield of propylene chloride, after deducting the 372 grams originally used in the mixture as solvent was 408 grams. The mixture of vented gases was washed with water to remove traces of hydrochloric acid and was then found to contain 69.4 grams of acetylene, approximately 3.0 grams of unreacted propylene, and minor proportions of air.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. A method of separating a lower acetylenic hydrocarbon from a mixture essentially comprising the same and propylene which consists in treating the mixture, while dissolved in an organic liquid less reactive with chlorine than the unsaturated components of the mixture, with chlorine in a proportion sufficient to react with substantially all of the propylene to form a chloropropane without appreciably reacting with the acetylenic hydrocarbon, and recovering the acetylenic hydrocarbon.

2. The method of treating a gaseous mixture of propylene and lower acetylenes which comprises dissolving the same in a liquid solvent substantially unreactive with chlorine under the conditions of the next succeeding step, adding chlorine in amount not substantially exceeding one molecular equivalent of the propylene in the gaseous mixture, while maintaining the reaction temperature below 90° C., removing unreacted gases containing the acetylenes originally present in the mixture, and distilling the remaining liquid to recover propylene chloride therefrom.

3. The method according to claim 2, in which propylene chloride is employed as the reaction solvent.

4. The method according to claim 2, in which the gaseous hydrocarbon mixture and chlorine are simultaneously introduced into the reaction solvent.

EDGAR C. BRITTON.
MYRON E. HUSCHER.